Apr. 3, 1923.

J. L. WALKER,

SAWING MACHINE

Filed Mar. 8, 1921

Inventor

J.L.Walker,

By C.A.Snow & Co.

Attorneys

J. L. WALKER 1,450,657

SAWING MACHINE

Filed Mar. 8, 1921

Inventor
J.L.Walker,
By C.A.Snow & Co.
Attorneys

Patented Apr. 3, 1923.

1,450,657

UNITED STATES PATENT OFFICE.

JOSEPH LEE WALKER, OF BATON ROUGE, LOUISIANA.

SAWING MACHINE.

Application filed March 8, 1921. Serial No. 450,688.

*To all whom it may concern:*

Be it known that I, JOSEPH LEE WALKER, a citizen of the United States, residing at Baton Rouge, in the parish of East Baton Rouge and State of Louisiana, have invented a new and useful Sawing Machine, of which the following is a specification.

This invention relates to a machine for sawing strips of veneer and other thin materials, one of its objects being to provide a machine of this character which will automatically pick up a stack of the strips to be cut, grip them so as to press out all wrinkles and warps, and then feed the strips to saws arranged in the paths thereof.

A further object is to provide a machine of this character which will cut off a number of strips simultaneously so that they will be of the same length, it being possible readily to supply strips to the machine so that they will be conducted automatically to the saws.

Another object is to provide simple means for releasing the strips after they have been cut, thus permitting them to gravitate from the machine and allow other strips to be fed to the machine in place thereof.

Another object is to provide a machine which is readily adjustable so as to cut the strips of any desired length or to make two or more pieces of predetermined lengths out of each strip fed to the saws.

With the foregoing and other objects in view which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings the preferred form of the invention has been shown.

In said drawings

Figure 3 is a plan view.

Figure 1:
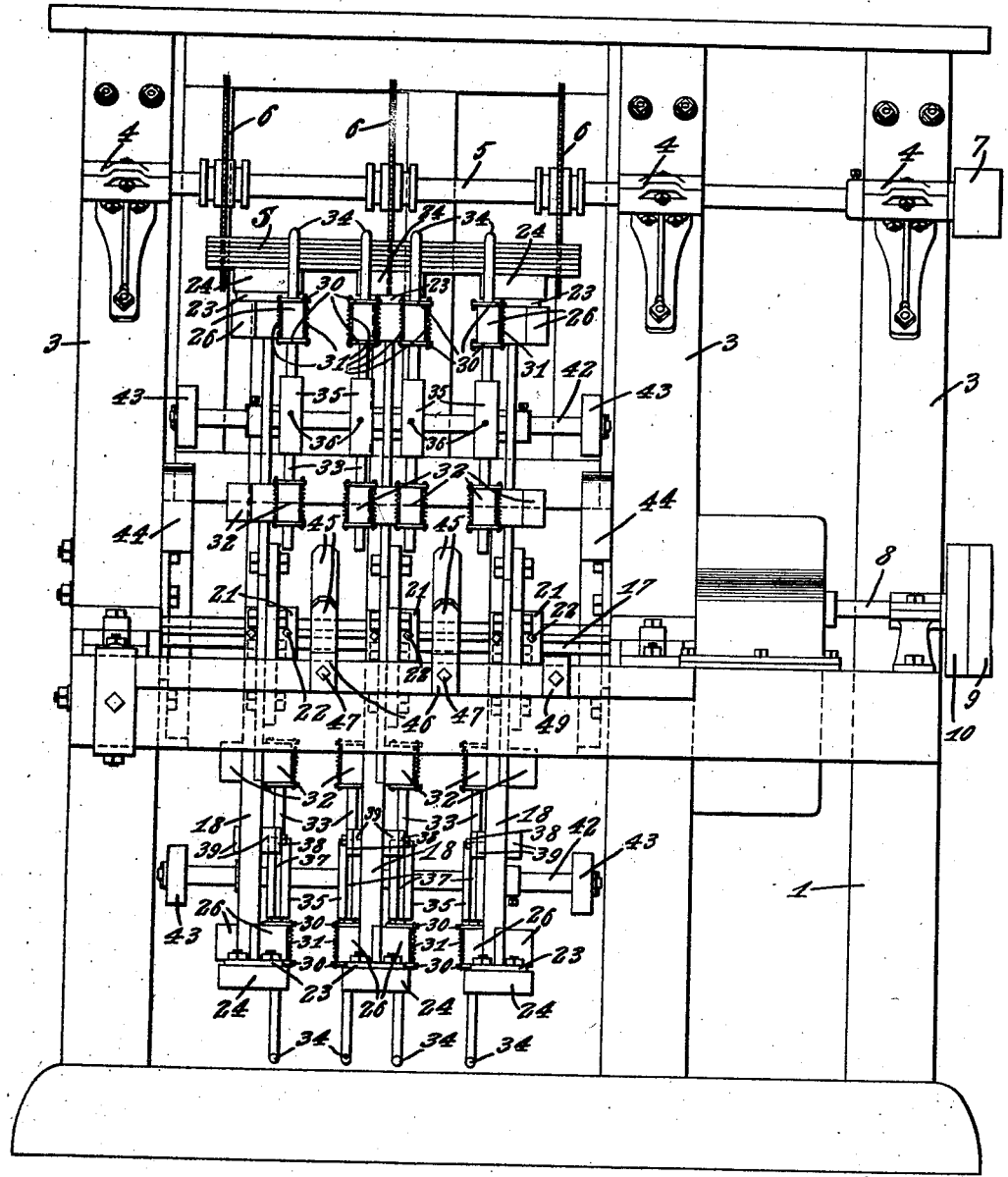
Figure 1 is a front elevation of the machine.

Referring to the figures by characters of reference 1 designates a supporting frame having rear standards 2 to which are connected inclined braces 3 at the sides of the frame. A bearing 4 is secured to the upper portion of each of these braces and has a transverse shaft 5 journaled therein. On this shaft are mounted circular saws 6 which are adjustable to any desired position relative to each other. One end of the shaft is provided with a pulley 7 whereby power can be transmitted to the saws from any suitable source. A short shaft 8 is journaled on the frame 1 adjacent one side and has pulleys 9 and 10 thereon, one pulley being loose and the other fixed to the shaft 8. A beveled gear 11 is secured to the inner end of the shaft 8 and meshes with a beveled gear 12 secured to a downwardly and rearwardly inclined shaft 13 which is journaled in suitable bearings 14 provided therefor. A worm 15 is secured to and rotates with the shaft 13 and meshes with a worm gear 16. The gear 16 is secured to a transverse shaft 17 journaled on the frame 1 and secured to this shaft so as to rotate therewith is a series of conveyor arms 18 mounted at their centers on the shaft and provided along their advancing edges with reenforcing ribs 19. To one side of each of the arms at the center thereof is secured a reenforcing disk 20 and this disk has a hub 21 which is adjustably secured to the shaft 17 by a set screw 22 or the like. Thus it will be seen that the arms can be adjusted toward or from each other along the shaft and then secured against further relative movement.

Figure 7:
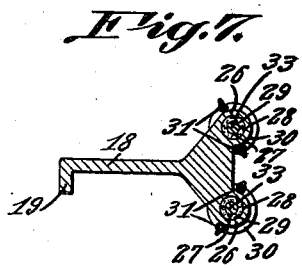
Figure 7 is a section on line 7—7, Figure 5.

The two end portions of each of the conveyor arms 18 are duplicates of each other. Each free end of the arm is provided with laterally extending flanges 23 on which are secured blocks 24 of wood or similar material, bolts 25 being provided for this purpose. Adjacent these flanges 23 and at the back or following edge of each end portion of the arm are laterally extending guide ears 26 shown in section in Figure 7 and in these ears are provided parallel openings 27 the ends of which are counterbored as at 28. Packing indicated at 29 is arranged within each counterbore and washers 30 extend across the outer faces of the packing and are held together by coiled springs 31 so that dust and grit are thus kept out of the packing.

Another pair of guide ears 32 is provided in line with the ears 26 and are similarly constructed. Slidably mounted within the openings in the aligned ears are rods 33 the outer ends of which are provided with fingers 34 which are extended across the blocks 24 and in the direction of rotation of the arm. To these rods 33 are secured weights 35 located between the aligned ears 26 and 32 and held to the rods by set screws 36 or the like. Guide grooves 37 are formed in the advancing edges of the weights and receive guide plates 38 secured to extensions 39 on opposed sides of the arm 18. Thus the weights are free to move relative to the arm by gravity, carrying with them the rods 33.

Formed within the weights on all of the arms are transverse openings 40 and longitudinal slots 41 are formed in all of the arms 18 between the openings in the adjacent weights. Extending transversely through the slots 41 adjacent one end of all the arms is a transverse shaft 42 which also extends through all of the openings 40 adjacent the said slots 41, this shaft being provided at its ends with rollers 43. A similar shaft with rollers extends through the slots and openings adjacent the other end of the arms 18.

Secured to the frame 1 and arranged between the shaft 17 and the back portion of the frame are cams 44 arranged in the paths of the rollers 43, these cams being so disposed that after the upper ends of the arms 18 pass from under the saws 6 and begin to descend, the rollers 43 will engage the cams 44 so as to shift the shaft 42 toward the upper or outer ends of the slots 41, thereby raising the weights 35 and the rods 33 and shifting the fingers 34 away from the blocks 24.

Figure 3:
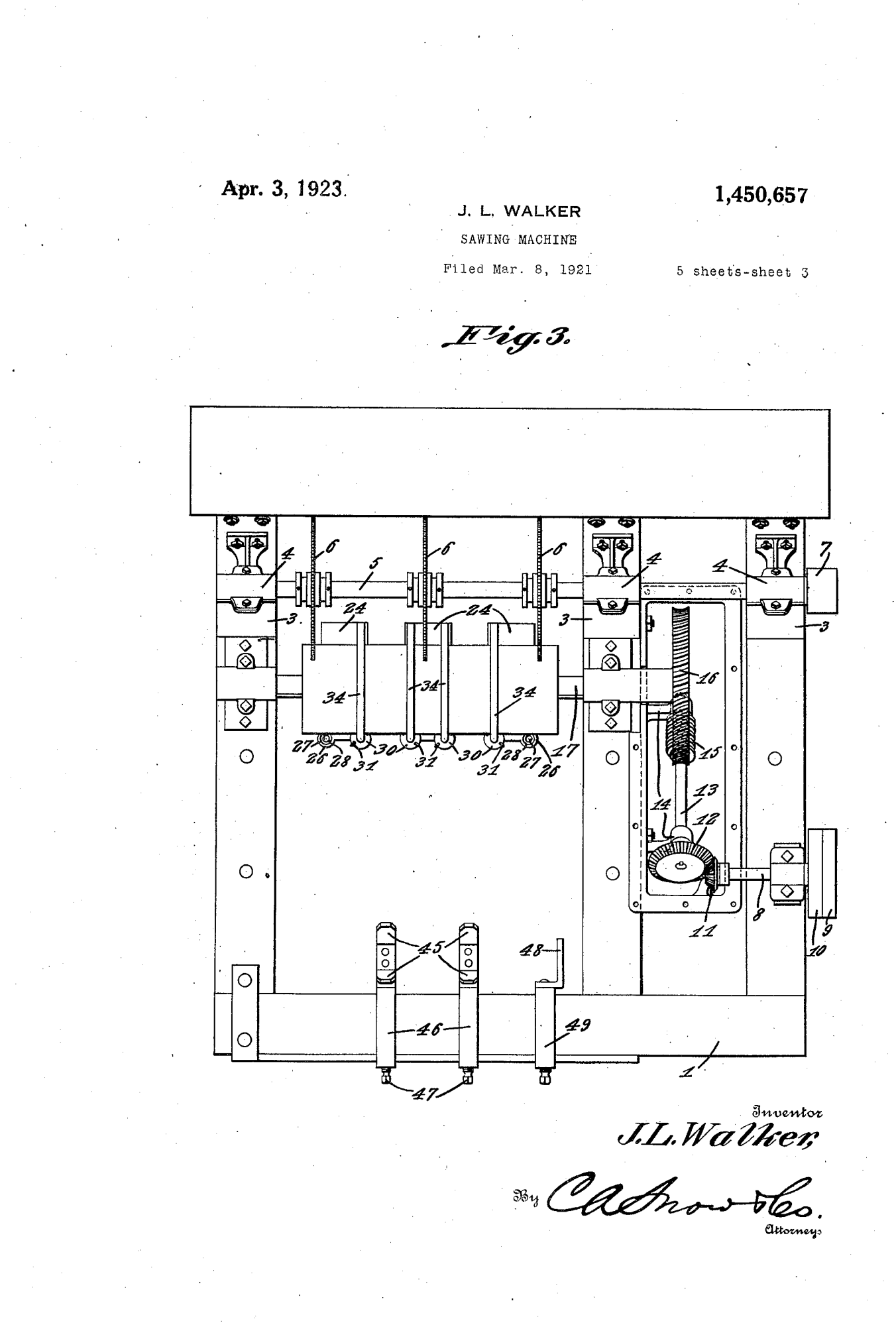

Suitably secured to the front portion of the frame 1 are upstanding diverging fingers 45 arranged in pairs, the said pairs being adjustable relative to each other as shown in Figure 3, the fingers of each pair being extended from a yoke 46 which straddles the front portion of the frame 1 and has a set screw 47 for securing the yoke in any position to which it may be moved. A gauge finger 48 is arranged adjacent the fingers 45 and is also extended from a yoke 49 adjustably mounted on the front portion of the frame 1. The fingers 45 cooperate to form a hopper in which strips of veneer may be placed on edge so that they will be supported with their lower edges in the same plane. These strips can be adjusted laterally against the gauge 48 when placed in the hopper. The fingers 45 are positioned so that during the rotation of the conveyor arms the fingers 34 carried by the arms will pass between the pairs of fingers 45.

Figure 2:
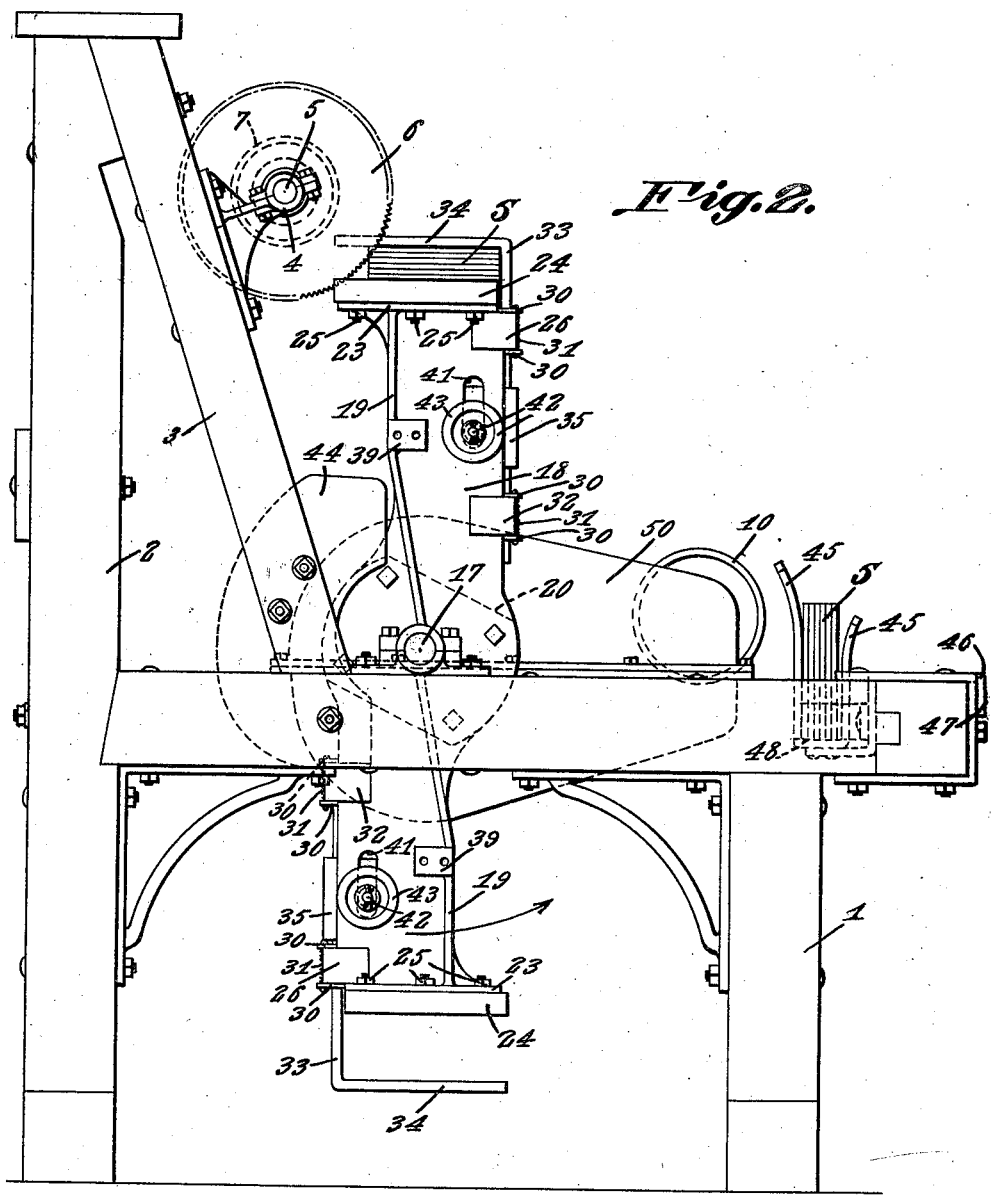
Figure 2 is a side elevation thereof.
Figure 4:
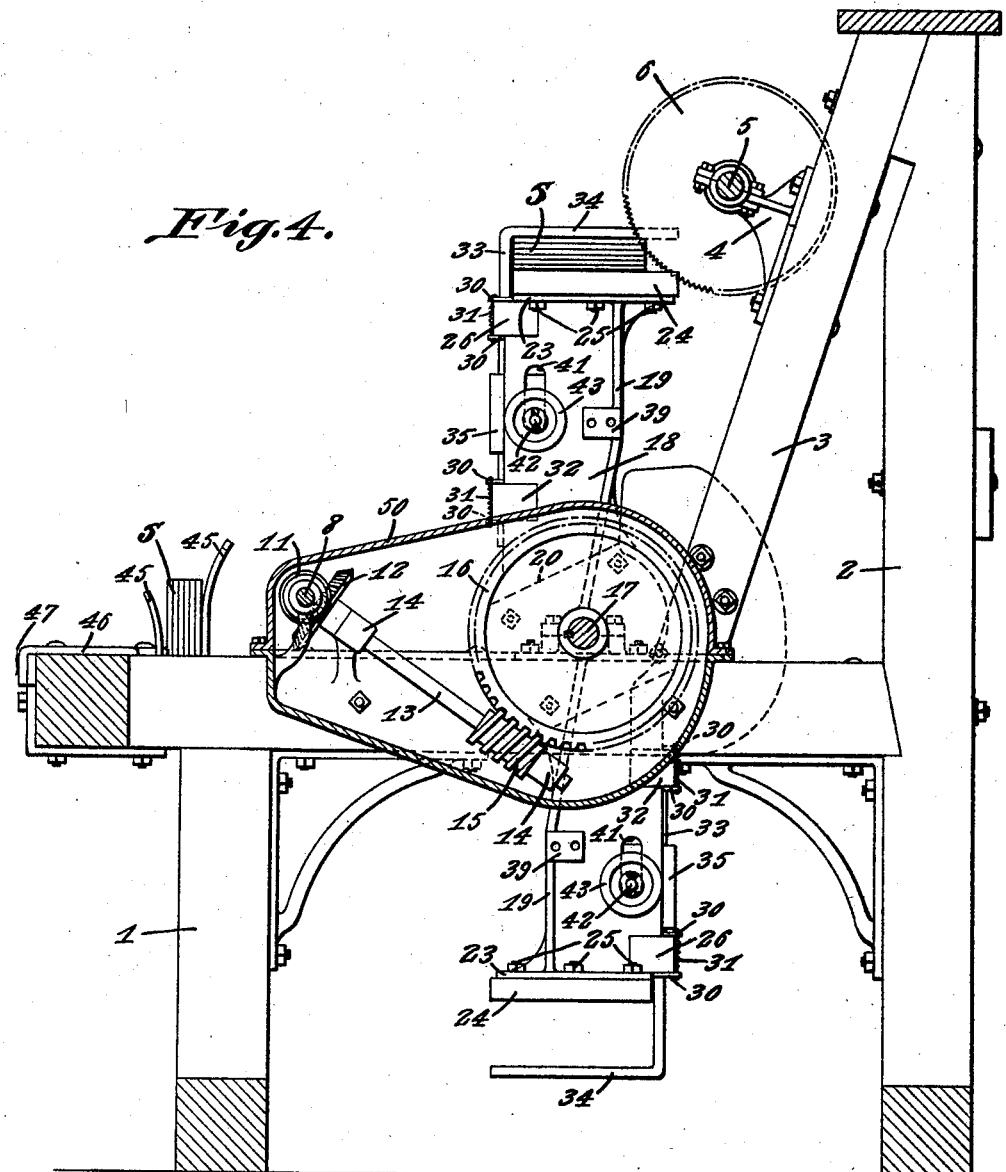
Figure 4 is a vertical longitudinal section.
Figure 5:
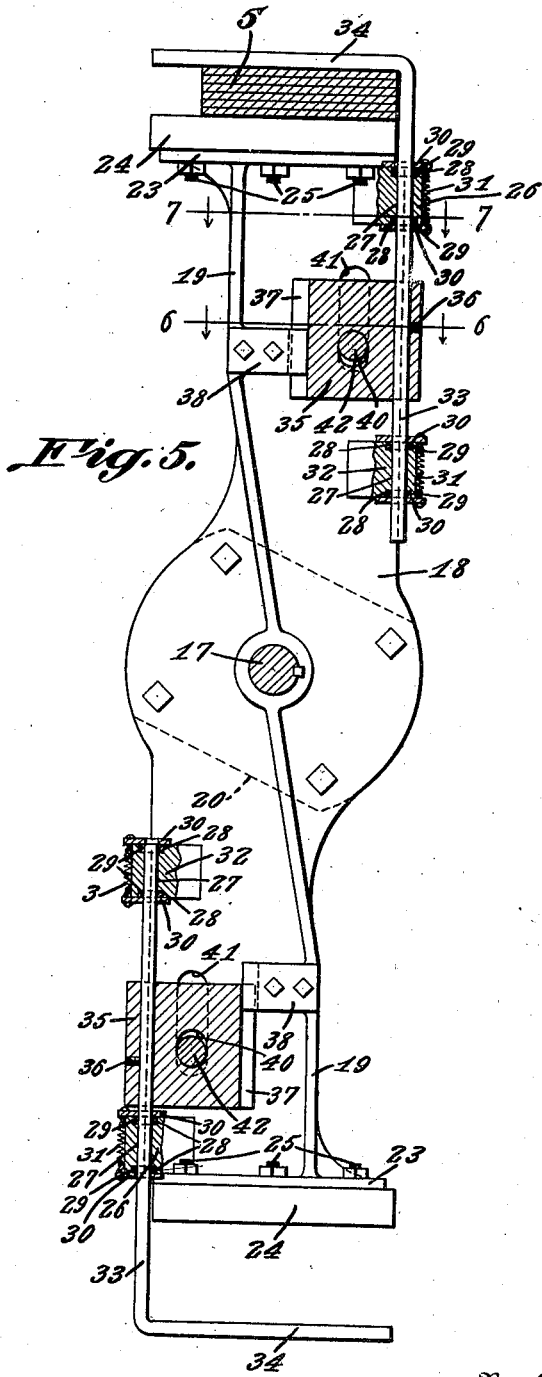
Figure 5 is an enlarged section through the rotary carrier and showing a stack of strips of veneer or the like held by one end thereof.
Figure 6:
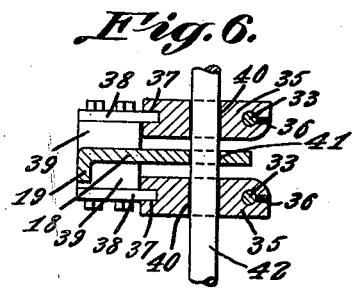
Figure 6 is a section on line 6—6, Figure 5.

In operation the strips to be cut are placed on edge between the fingers 45 and against the gauge 48 and the mechanism is set in motion. The arms 18 will rotate in the direction indicated by the arrow in Figure 2, the lowermost fingers 34 being held down away from the blocks 24 because the weights 35 slide downwardly by gravity after the arm passes below its horizontal position, thereby moving the rods 33 and the fingers 34 therewith. The fingers 34 remain in lowered position during the upward movement of the lower portions of the arms 18 and the parts are so proportioned that as the arms approach their horizontal positions the rods 33 and fingers 34 will pass between the fingers 45 and engage the lower edges of the strips S, lifting said strips from between the fingers 45 and carrying them upwardly toward the rotating saws 6. As the upper portions of the arms 18 move upwardly beyond the horizontal, the weights 35 will slide downwardly pulling the rods 33 therewith and causing the fingers 34 to bind upon the strips S and press said strips tightly upon the blocks 24. Thus all wrinkles and warps in the strips S will be pressed out and the said strips will be held firmly as they are fed against the saws 6. The saws will cut through all of the strips at one operation and without necessitating the stopping of the rotation of the carrier arms 18. As the upper ends of the arms move downwardly and rearwardly the upper rollers 43 will engage the cam 44 and be shifted thereby so as to push the fingers 34 away from the strips S. Thus the strips will be released and will be free to drop out of the machine. In the meantime another set of strips S has been placed between the fingers 45 so that just after the cutting of one set of strips by the saws 6 the lower fingers 34 will engage and lift another set of strips S that have been placed between the fingers 45. Thus a continuous cutting operation can be effected and the veneer can be quickly and accurately cut to desired lengths.

Obviously the gearing used for driving the conveyor arms can be arranged within a housing 50 as shown so as to protect the operator from injury.

What is claimed is:—

1. In a machine for cutting veneer the combination with stack holding means, of aligning arms mounted for rotation about a common axis, spaced saws mounted for rotation about a common axis, said arms being adjustable toward and from each other, rods slidably mounted upon the arms, blocks secured to the outer ends of the arms and constituting stack supports, fingers extending transversely of and parallel with the blocks and carried by the rods, said rods constituting means for engaging a stack during the rotation of the arms and lifting it from its holding means, weights connected to the rods and operating by gravity to bind the fingers upon the stack engaged by the rods to clamp the stack throughout its width upon the blocks, said fingers engaging the stack at points close to and parallel with the planes of the saws.

2. A veneer sawing machine comprising stack holding means, spaced saws, a series of aligning arms mounted for rotation, locks upon the arms, weighted rods slidable on the arms and constituting means for engaging a stack and removing it from the holding means, fingers extending from the rods for binding upon the removed stack and clamping it throughout its width upon the blocks, said arms being adjustable relative to each other to position the fingers at opposite sides of and close to the line of cut by each of the saws.

3. A veneer cutting machine including means for holding a stack of veneer, spaced saws, a series of aligning arms mounted for rotation about a common axis, rods upon the arms mounted for right line movement, clamping fingers extending from the rods, blocks on the arms parallel with the fingers, said rods constituting means for simultaneously engaging a stack and removing it from its holding means, and gravity operated means for actuating the rods to bind the fingers upon the stack and clamp said stack to the blocks along lines close to opposite sides of and parallel with the lines of cuts by the saws.

4. A veneer cutting machine comprising means for holding a stack of veneer strips, a gauge for aligning the strips at one end, spaced saws, spaced arms disposed in alignment and mounted for rotation about a common axis, rods slidably mounted on the arms for simultaneously engaging the stack and removing it from the holding means, fingers extending from the rods along parallel lines, and gravity operated means for automatically shifting the fingers to bind them flat upon stacks of different thickness to clamp the stacks throughout their width along lines close to and at opposite sides of the lines of cuts by the saws.

In testimony that I claim the foregoing as my own, I have hereto affixed my signature in the presence of two witnesses.

JOSEPH LEE WALKER.

Witnesses:
   J. H. DOZIER,
   B. D. CLENEAY.